April 18, 1961  M. G. BULLOCK  2,979,831
DEVICE FOR PORTRAYING SPEED, TIME, DISTANCE, AND REACTION
MEASUREMENTS AS RELATED TO VEHICLE DRIVING
Filed Jan. 24, 1955                                        2 Sheets-Sheet 1

INVENTOR:
MELVIN G. BULLOCK,
BY Kingsland, Rogers & Ezell
ATTORNEYS

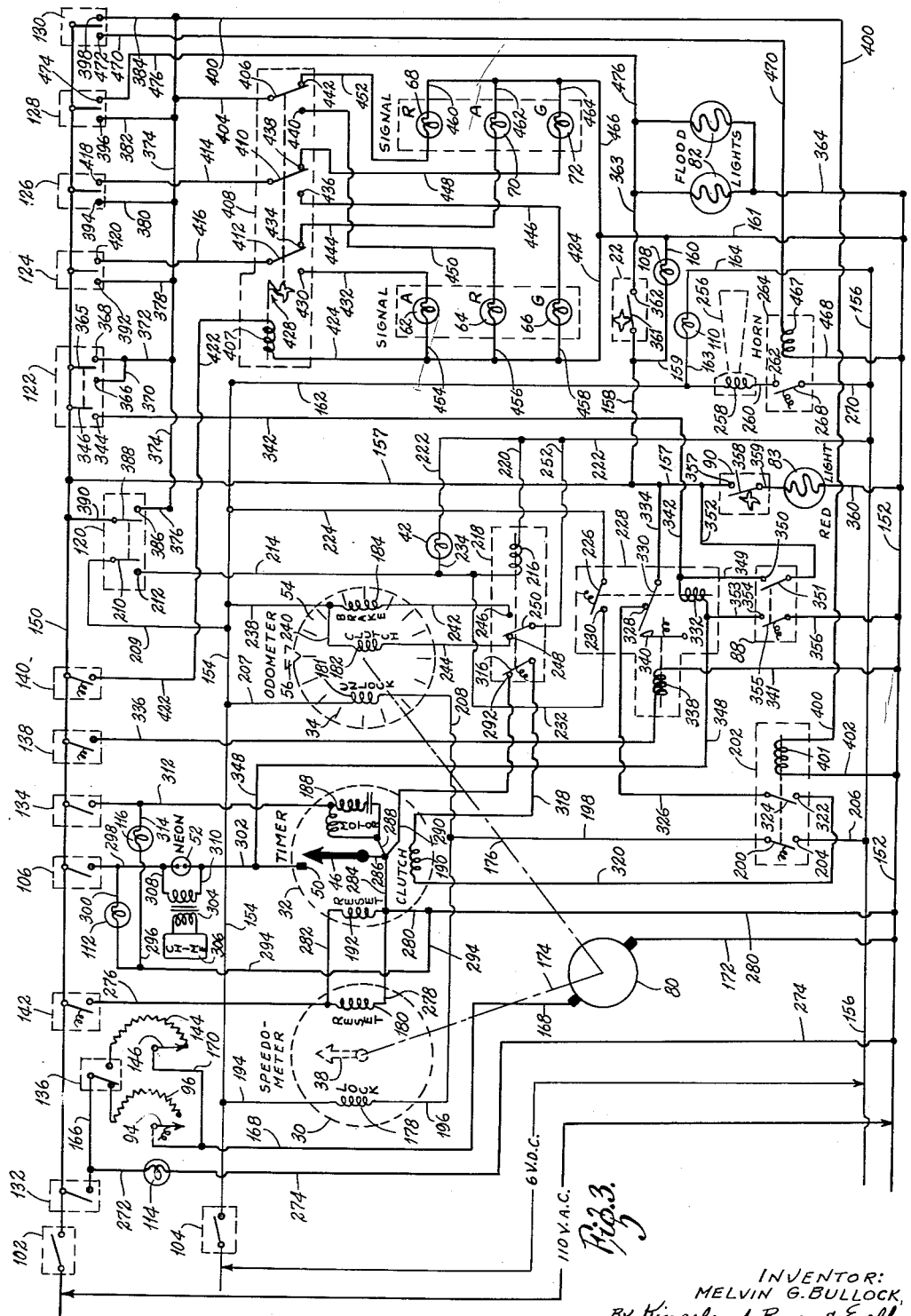

United States Patent Office 2,979,831
Patented Apr. 18, 1961

2,979,831

DEVICE FOR PORTRAYING SPEED, TIME, DISTANCE, AND REACTION MEASUREMENTS AS RELATED TO VEHICLE DRIVING

Melvin G. Bullock, 7475 Rupert Ave., Richmond Heights, Mo.

Filed Jan. 24, 1955, Ser. No. 483,526

4 Claims. (Cl. 35—11)

The present invention relates generally to educational devices, and more particularly to a novel apparatus for testing and measuring human reaction to various stimuli encountered in the operation of automotive vehicles for demonstrating the over-all results in terms having safety significance to the average automobile operator. In addition, the device analyzes speed and time in terms of distance traveled in feet, or it portrays "speed-time-distance and reaction measurements."

Although few will deny the public safety in general, and traffic safety in particular, is properly the concern of all, the appalling annual accident rate, along with reliable statistics as to the factors which lead to traffic accidents, makes it apparent that much remains to be done in the field of driver training and education. Nor is it enough merely to expound the technical and mechanical causes of accidents and to identify and tabulate the factors which contribute to avoidable accidents. Rather, there must be developed in the driving public an awareness, and a proper appreciation, of the significance of those factors which have long been recognized in kind, if not in degree.

It has often been proposed, for example, to base driving qualifications, at least in part, upon the ability of a would-be driver to pass a standardized test for responsive reaction to various normally encountered stimuli. While such testing may serve very well to distinguish between those who should be permitted to operate automotive vehicles and those who should not, it would seem eminently profitable to enlarge and improve upon the procedure to a point where meaningful knowledge would be imparted to all who took the test, whether they passed or failed. The mere fact that a particular person has been found to have sufficiently rapid mental and physical reaction to pass, rather than to fail, a given test is not constructive to safe driving by that person. If, however, the testing and measuring procedure should include a clear demonstration of the safety significance of reaction time, including an interpretation of the relationship between speed and reaction time, the results could be expected to have far reaching benefits.

It is an object of the present invention, therefore, to provide a novel apparatus which is effective to measure human reaction time and to interpret the results in terms having safety significance to the average operator of automotive vehicles, namely, to interpret the results in terms of distance traveled during a reaction period.

It is another object of the invention to provide a novel apparatus which is adapted to produce normally encountered traffic stimuli, to measure the time of reaction thereto, and to display the results in terms having safety significance.

It is another object of the invention to provide an apparatus which simulates various traffic conditions for driver testing, which automatically correlates the factors of speed, time, and distance, and which instantaneously displays test results in readily understood and appreciated terms having safety significance.

It is another object of the invention to provide an apparatus for demonstrative driver testing which is adapted to distinguish and to signal an incorrect response on the part of the student driver.

The foregoing objects, along with additional advantages, will be more fully appreciated from the following description of one embodiment of the invention illustrated in the accompanying drawings, in which:

Figure 3 is a schematic circuit diagram showing the cooperative interrelation between operative elements of the apparatus.

Figure 1:
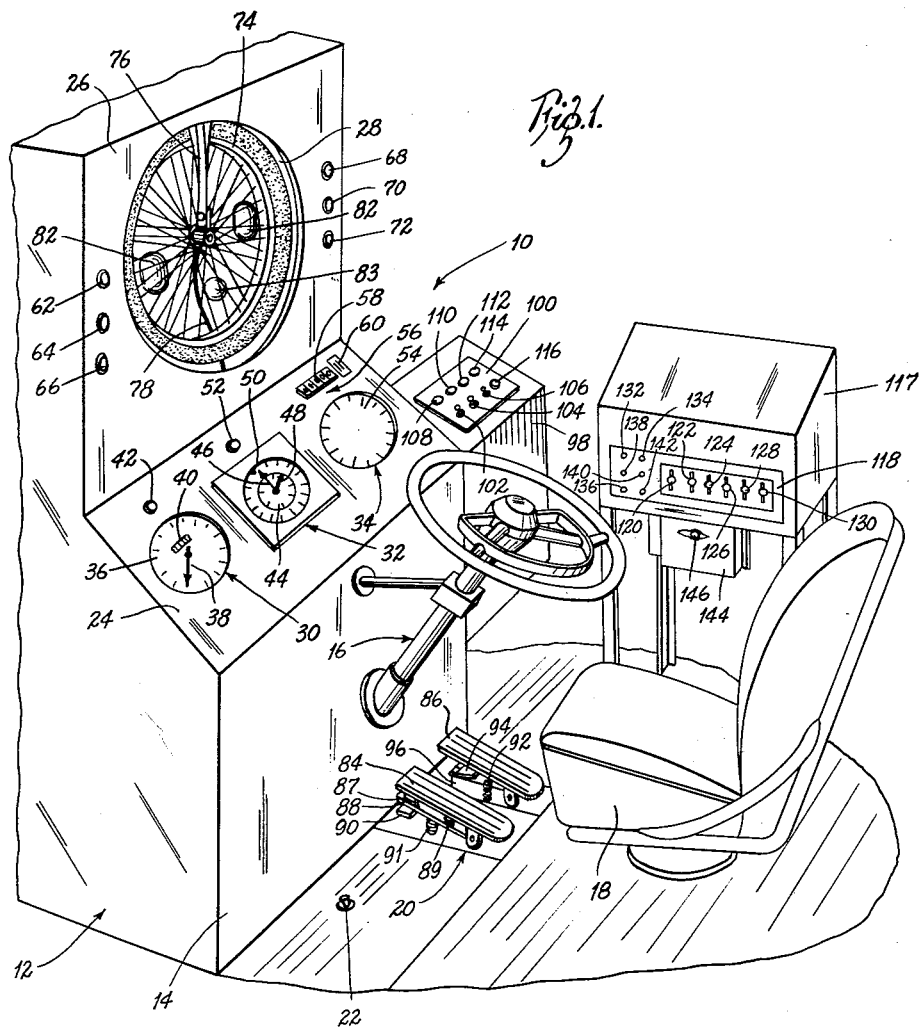
Figure 1 is a view in perspective of an apparatus conforming to the teachings of the present invention.

Referring more particularly now to Figure 1, a preferred embodiment of the demonstration apparatus of the present invention is designated generally by the reference numeral 10. The apparatus 10 is arranged for the most part to represent the driver's station in an automotive vehicle. To this end, an upright cabinet 12 has a lower vertical panel 14 to which is mounted a conventional steering wheel assembly 16. A seat 18 is provided opposite the steering wheel assembly 16, and a pedal assembly 20 is disposed on the floor in the usual relation to the steering wheel and the seat. A ratchet switch 22 is located to the left of the pedal assembly 20 so as to correspond to the familiar beam deflecting switch in automobiles.

The cabinet 12, besides mounting the steering wheel assembly 16, contains operative equipment to be described for the most part hereinafter. From Figure 1, however, it will be noted that certain elements of equipment are mounted for observation from the driver's seat in front of the cabinet 12. The latter elements include indicating instruments mounted on a sloping panel 24 of the cabinet 12, lights mounted on an upper vertical panel 26, and a motion device which is visible through an opening 28 in the panel 26.

To be more explicit, the indicating instruments above mentioned include a speedometer assembly 30, a timer assembly 32, and an odometer assembly 34. The speedometer 30 has a stationary dial face 36 having a suitable scale of markings thereon to indicate simulated speeds from zero to 100 miles per hour. A pointer 38 is pivoted at the center of the dial 36 and an odometer 40 is coordinated in the usual way with the pointer 38 to indicate miles and tenths of miles of simulated travel. It may be mentioned at this point also that the speedometer 30 is a type used in police work and hence incorporates well known means for locking the pointer 38 and thereby retaining it in the position occupied at the time of locking. An indicating light 42, such as a jewel light, although located in the panel 24 directly above the speedometer 30, is not connected directly with the operation of the latter, but is for a purpose to appear.

The timer 32 comprises a stationary dial face 44 having two concentric scales thereon. The outer scale is calibrated in one-hundredths of one second so that one revolution of a pointer 46 will indicate the elapse of one second. The inner scale, on the other hand, is calibrated in seconds, so that one revolution of a pointer 48 will indicate the elapse of sixty seconds or one minute. It will be understood that the pointers 46 and 48 are rotated by a conventional electric timing motor. The timer 32 is distinguished from a wholly conventional instrument, however, in having a contact element 50 mounted on the dial face 44 in such position that it will be contacted by the pointer 46 just prior to the latter completing one revolution from its zero position. A preferred position for the contact 50 will be discussed hereinafter. A small neon bulb 52 is mounted in the panel 24 immediately above the timer 32.

The odometer 34 here illustrated includes a rotatable dial face 54 scaled in feet so that one revolution of the dial 54 past a pointer 56 indicates a simulated travel of one hundred feet. A counter 58 located in the panel 24 immediately above the pointer 56 is cooperatively associated with the odometer 34 so as to count the revolutions of the dial 54. The counter 58 includes a resetting wheel 60.

The lights mentioned above as being mounted on the vertical panel 26 are arranged in two laterally spaced groups of three, as clearly indicated in Figure 1. Thus arranged, lights 62, 64 and 66 comprise a group simulating the vertical cluster in a conventional traffic signal light. In like manner, lights 68, 70 and 72 comprise a second group, similar to the first, but with the lights arranged in other than conventional order, for the purpose of detecting color blindness in persons under test. The lateral separation of the two groups is preferably such as to subtend an angle of at least twenty degrees at the eye of an observer in the seat 18.

A rotatable wheel 74 is mounted within the cabinet 12 so as to be viewed through the opening 28 in the upper panel 26. Any suitable means, such as the element designated generally as 76 may be provided for mounting the wheel 74, and wholly conventional means including a torsion drive 78 is provided for connecting the wheel 74 to the speedometer 30 and to the odometer 34. A variable speed motor 80, depicted schematically in Figure 3, is mounted within the cabinet 12 so as to be in driving connection with the wheel 74, and hence in driving connection also with the speedometer 30 and the odometer 34.

In addition to the wheel 74, the upper portion of the cabinet 12 has mounted therein a pair of flood lights 82 and a red spotlight 83. These lights 82 and 83 are disposed directly behind the wheel 74 so that they may shine through the spokes of the latter and through the opening 28 into the eyes of a person sitting in the seat 18.

The pedal assembly 20, as is clear from Figure 1, includes a left hand pedal 84 and a right hand pedal 86, representing a brake pedal and an accelerator pedal, respectively. An auxiliary leaf member 87 is pivotally mounted beneath the "brake" pedal 84 and supports a switch 88 for actuating engagement by the pedal 84. A compression spring 89 interposed between the leaf member 87 and the pedal 84 biases the latter toward a position of non-engagement with the switch 88. A ratchet switch 90 is located beneath the leaf member 87 for actuating engagement thereby, and a compression spring 91, substantially stiffer than the spring 89, is disposed beneath the member 87 so as to bias the same toward a position of non-engagement with the switch 90. Clearly, the arrangement is such that the application of moderate pressure upon the pedal 84 will effect actuation of the switch 88 only, whereas the application of substantially greater pressure will actuate the switch 90 as well.

The "accelerator" pedal 86, although biased by a spring 92 toward a normal raised position, cooperates with a movable arm 94 of a rheostat 96. As will be more fully explained hereinafter, the rheostat 96 is adapted to control the speed of rotation of the aforementioned wheel 74, speedometer 30, and odometer 34.

An auxiliary cabinet 98 located at the right hand side of the cabinet 12 contains certain electrical equipment to be described, and includes a master panel 100. The panel 100 has mounted therein switches 102, 104, and 106 each of which is associated with a respective indicating light 108, 110, and 112. There are also indicating lights 114 and 116 each having a purpose to be explained hereinafter.

Figure 2:
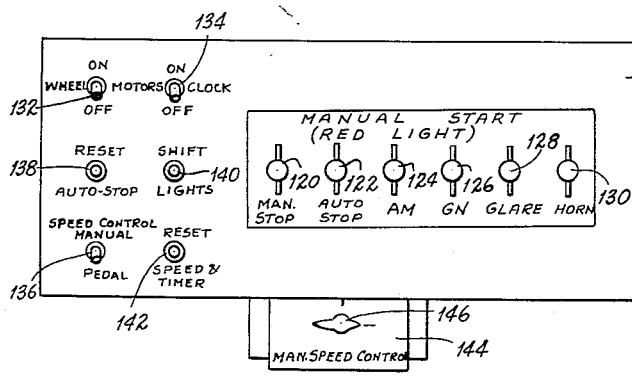
Figure 2 is a front elevation of a control panel for operation by a person conducting constructive demonstration with the apparatus.

A control cabinet 117, besides containing control elements also to be more fully explained hereinafter, includes a control panel 118. An enlarged view of the panel 118 is shown in Figure 2. The panel 118 includes six three-position toggle switches 120, 122, 124, 126, 128 and 130. In addition, there are three single throw toggle switches 132, 134, and 136. Finally, there are three push button switches 138, 140 and 142.

A rheostat assembly 144 is mounted immediately below the panel 118 and includes a knob 146 for manual control of the speed of rotation of the wheel 74, as will appear.

Referring now to Figure 3, it will be observed that the apparatus 10 incorporates two systems of electrical circuits, namely, a 110-volt A.C. circuit and a 6-volt D.C. circuit. The 110-volt system includes main bus bars 150 and 152, the former being connected to an appropriate A.C. line through the switch 102, and the bus bar 152 being connected directly to the other side of the 110-volt line. Similarly, the 6-volt system includes a bus bar 154 connected by means of the switch 104 to one side of an appropriate 6-volt voltage source (not shown), and a bus bar 156 connected directly to the other side of the same 6-volt voltage source. It will be noted that both the switch 102 and the switch 104 are single pole, single throw switches upon closure of which the respective 110-volt and 6-volt systems are energized. Energization of these systems is evidenced by the indicating lights 108 and 110 being lighted. From Figure 3, it will be seen that the light 108 is connected across the bus bar 150 and 152 by means of leads 157, 158, 159, 160 and 161. In similar manner, the light 110 is connected across the bus bars 154 and 156 by means of leads 162, 163, and 164.

The motor 80 is connected into the bus bar 150 through the single throw switch 132. However, the previously mentioned rheostats 96 and 144 are interposed between the switch 132 and the motor 80. Thus, a lead 166 connects the switch 132 with the pole of the single pole, double throw switch 136, while the contacts of the latter are connected to the rheostat resistors 96 and 144, respectively. It will be noted, incidentally, that the arm 94 of the rheostat 96 is provided with a spring return and, furthermore, that the normal position of the arm 94 is such as to be disengaged from the rheostat resistor. The arm 146 of the rheostat 144, on the other hand, is not spring biased and hence will remain in any position to which it is manually adjusted. The arm 94 is connected by means of a lead 168 to one side of the motor 80, and a lead 170 connects the arm 146 of the rheostat 144 into the lead 168. The other side of the motor 80 is connected by a lead 172 into the bus bar 152.

Previous mention has been made that the motor 80 is mechanically connected to both the speedometer 30 and the odometer 34. Schematic representation of these mechanical connections is made in Figure 3 by means of the broken lines 174 and 176, it being understood that the connections thus schematically represented include the wheel 74, the cable 78, and other well known power transmitting and connecting devices. It may also be mentioned at this point that a portable device incorporating the novel features of the present invention would not necessarily require the wheel 74, for example, inasmuch as numerous equivalent driving arrangements are possible. As a matter of fact, even the electric motor 80 is not necessary where, as has been contemplated, the device is disposed in a motor bus, or the like, with the wheel 74 in rolling contact with the ground.

The speedometer 30, as previously indicated, is of the type used in police work and is therefore provided with conventional means for locking the pointer 38 at any time. Also, it incorporates well known means for resetting the pointer to a zero position. The locking means and the resetting means are schematically indicated in Figure 3 by the coils 178 and 180, respectively.

The odometer 34 is preferably of a well known type incorporating a friction device for transmitting a driving impetus to the dial 54 and a solenoid operated, spring biased locking arrangement whereby the dial 54 will be locked against advance from its zero position except during energization of a solenoid coil 181. Additional control over movement of the dial 54 resides in the connecting means 176 which, preferably, includes conventional electrically operated clutch and brake means for selectively establishing and disestablishing the driving connection between the motor 80 and the odometer 34. In Figure 3, these controls are represented by a clutch coil 182 and a brake coil 184, respectively.

The timer 32 is essentially a well known electrically operated instrument, having a continuously operating motor 188 which may be connected at will to rotate the indicating pointer 46, this connection being effected upon energization of a clutch coil 190. In addition, the timer 32 is provided with reset means including a coil 192 for returning the pointer 46 to its zero position.

The contact 50, previously mentioned as being added to the conventional timing device, is of course insulated therefrom so that selective electrical connection may be made with the pointer 46, the latter being connected into the 110-volt system as will appear. It should be emphasized that the contact 50 is of such size in correspondence with the inertia of the mechanism which rotates the pointer 46 that the latter will move to a point of disengagement from the contact 50 even though the clutch coil 190 should be deenergized at the instant the rotating pointer 46 might engage the contact 50. Moreover, the contact 50 is preferably located in such a position that deenergization of the clutch 190 upon engagement of the pointer 46 with the contact 50 will cause the former to stop substantially at its zero position. In one actual instance, it has been found that the contact 50 should be placed $\frac{4}{100}$ of a second ahead of the zero position of the pointer 46. This location may vary, of course, between the wide variety of timers that may be employed.

It will be appreciated, of course, that the principal reason for having the 6-volt D.C. system along with the 110-volt A.C. system in the apparatus 10 is that the specific speedometer and odometer assemblies employed in the illustrated apparatus are conventional 6-volt instruments for use in automotive installations. Clearly, the incorporation of two different voltage systems is not a requirement of the invention.

Considering now the 6-volt system illustrated in Figure 3, one circuit includes the locking coil 178 of the speedometer 30, this coil being connected by a lead 194 into the bus bar 154 and by leads 196 and 198 to a normally open pole 200 of a double pole, single throw relay 202. A contact 204 adapted to be engaged by the pole 200 is connected by a lead 206 to the bus bar 156. A parallel branch of this same circuit comprises a lead 207 extending from the bus bar 154 to one end of the unlocking coil 181 of the odometer 34, and a lead 208 connecting the other end of the coil 181 to the lead 198.

Another 6-volt circuit extends from the bus bar 154 through a lead 209 to a pole 210 of the double pole, three-position switch 120. A contact 212 engageable by the pole 210 is connected by a lead 214 to a coil 216 of a double pole, double throw relay 218. The other side of the coil 216 is connected by a lead 220 into a lead 222 connected into the bus bar 156.

A parallel circuit through the coil 216 comprises a lead 224 extending between the bus bar 154 and a normally open pole 226 of a double pole, single throw latching relay 228, a contact 230 engageable by the pole 226 being then connected by a lead 232 into the aforementioned lead 214. A lead 234, also connected into the lead 214, extends to the indicating light 42, which is then connected by the aforementioned lead 222 to the bus bar 156.

A circuit for energizing the coils 182 and 184, and thereby operating the above described clutch and brake means between the motor 80 and the odometer 34, includes a lead 238 which extends from the bus bar 154 to one end of the brake coil 184, and a branch lead 240 extending from the lead 238 to one end of the clutch coil 182. The other ends of the coils 184 and 182 are connected by respective leads 242 and 244 to individual contacts 246 and 248 of the relay 218. A double throw pole 250 of this same relay normally engages the contact 248, but is movable therefrom for engagement with the contact 246 upon energization of the coil 216 of the relay 218. This pole 250 is connected by a lead 252 to the aforementioned lead 222 extending to the bus bar 156.

A conventional automobile horn 256 having an actuating coil 258 has one end of the latter joined to the aforementioned lead 162, and the other end connected by a lead 260 into a normally open contact 262 of a horn relay 264. A pole 268 adapted to engage the contact 262 is connected by a lead 270 to the bus bar 156.

Proceeding now once more to the 110-volt system illustrated in Figure 3, the previously described indicating light 114 is connected by a lead 272 into the lead 166, and by a lead 274 into the bus bar 152. Thus connected, the light 114 serves to indicate the condition of the switch 132 and, hence, whether or not the motor circuits are prepared for operation of the motor 80.

The reset coil 180 of the speedometer 30 is connected to the bus bar 150 through the normally open, single pole push button switch 142 by means of a lead 276, and into the bus bar 152 by means of leads 278 and 280. The reset coil 192 of the timer 32 is also joined at one end to the lead 280 and has its other end connected by a lead 282 into the lead 276. Thus, both of the coils 180 and 192 are under control of the switch 142.

It will be observed that the lead 280 illustrated in Figure 3 provides a connection between the bus bar 152 and several other elements besides the reset coils 180 and 192. Thus, a lead 284 connected to the lead 280 connects also with leads 286, 288, and 290 extending, respectively, to the timer pointer 46, the timer motor 188, and a normally closed contact 292 of the relay 218. Also, a lead 294 having one end connected into the lead 280 has its other end connected to the light 112, while a lead 296 is provided between the lead 294 and the light 116.

Besides being connected into the bus bar 152, the several elements just mentioned are of course also connectible with the bus bar 150. To this end, the single pole, single throw switch 106, connected by a lead 298 to the neon bulb 52, controls also the light 112 through a lead 300 connected between the light 112 and the lead 298. The other side of the neon bulb 52 is connected by a lead 302 to the contact 50 previously described. A transformer 304 for operating a chime signal 306 is connected in parallel with the neon bulb 52 through leads 308 and 310 connected into the leads 298 and 302, respectively.

The single pole, single throw switch 134 connected directly into the bus bar 150 is also connected by a lead 312 to the timer motor 188. A lead 314 connects the indicating light 116 with this lead 312.

Returning now to the circuit previously traced from the bus bar 152 through the leads 280, 284, and 290 to the normally closed contact 292, a pole 316 adapted to be disengaged from the contact 292 upon energization of the coil 216 of the relay 218 is connected by a lead 318 to one end of the clutch coil 190 of the timer 32. The other end of this coil is connected by a lead 320 to a normally open contact 322 of the double pole, single throw relay 202. A pole 324 engageable with the contact 322 is connected by a lead 326 to a normally closed contact 328 of the double pole, single throw latching relay 228, and a pole 330 adapted to be disengaged from the contact 328 upon energization of a coil 332 of the relay 228 is connected by a lead 334 into the lead 157 joined to the bus bar 150 as aforementioned.

The single pole push button switch 138 connected directly to the bus bar 150 is also connected by a lead 336 to one side of a coil 338 adapted to withdraw a spring biased latch 340 which functions in conventional manner to retain the poles 226 and 330 of the latching relay 228 in actuated position pending subsequent energization of the coil 338. The other side of the coil 338 is connected by a lead 341 into the bus bar 152.

The coil 332 for actuating the latching relay 228 has one end connected by a lead 342 to a contact 344 of the double pole, three-position switch 122. A pole 346 adapted to engage the contact 344 is connected directly into the bus bar 150. The other side of the coil 332 is connected by a lead 348 into the previously described lead 302 making connection with the contact 50 provided in the timer 32. In addition to the circuit through the coil 332 just traced, a lead 349 extends from the lead 342 to a contact 350 of the double pole, single throw, normally open switch 88, and a pole 351 engageable with the contact 350 is connected by a lead 352 into the lead 157 connected to the bus bar 150 as aforementioned. The lead 348 extending from the other side of the coil 332 is connected by a lead 353 to a contact 354 of the switch 88, while a pole 355 engageable with the contact 354 is connected by a lead 356 to the bus bar 152.

The single pole, single throw ratchet switch 90 has a contact 357 joined to the lead 157, and has a pole 358 connected by a lead 359 to one side of the previously described red light 83. The other side of the light 83 is connected by a lead 360 to the bus bar 152. In generally similar manner, the single pole, single throw "beam deflecting" ratchet switch 22 has a pole 361 joined to the head 158, and a contact 362 connected by a lead 363 to the flood lights 82, arranged in parallel as illustrated and connected on into the bus bar 152 by a lead 364.

Returning to the switch 122, a pole 365 adapted to engage either of contacts 366 or 368 is connected directly into the bus bar 150, while the aforementioned contacts are connected by means of leads 370 and 372 into an auxiliary connecting lead 374. In addition to the lead 372, the auxiliary connecting lead 374 has connected thereinto leads 376, 378, 380, 382 and 384, each of these being connected into a separate switch as will appear. Thus, the lead 376 is connected to a contact 386 adapted to be engaged by a pole 388 of the double pole switch 120. The pole 388 is in turn connected by a lead 390 to the bus bar 150. Similarly, the leads 378, 380, 382 and 384 are connected to contacts 392, 394, 396 and 398 of the respective switches 124, 126, 128 and 130. The poles of these several switches are all directly connected into the bus bar 150.

The auxiliary connecting lead 374 is connected by a lead 400 to one side of an actuating coil 401 of the relay 202, the other side of this coil being connected by a lead 402 to the bus bar 152. The auxiliary connecting lead 374 is also connected by a lead 404 to a pole 406 of a triple pole, double throw ratchet relay 408. The remaining poles 410 and 412 of the relay 408 are connected by leads 414 and 416 to contacts 418 and 420 of the switches 126 and 124, respectively.

A coil 407 of the relay 408 has one side connected through a lead 422 to the normally open push button switch 140 connected directly to the bus bar 150. The other side of the coil 407 is connected by a lead 424 to the lead 161 previously described as being connected to the bus bar 152. As is conventional, the coil 407 of the relay 408 is adapted to actuate a ratchet mechanism, shown generally as 428, which functions to move the three poles 406, 410, and 412 from one of their respectively associated contacts to the other upon successive energizations of the coil 407.

Considering now the contacts of the ratchet relay 408, it will be noted that each of the contacts makes connection with one of the signal lights mounted on the front panel 26 of the previously described cabinet 12. Thus, a contact 430 is connected by a lead 432 to the signal light 62. In similar fashion, contacts 434, 436, 438, 440 and 442 are connected by leads 444, 446, 448, 450, and 452 to the signal lights 70, 66, 72, 64, and 68, respectively. The other sides of the lights 62, 64, and 66 are connected by respective leads 454, 456, and 458 into the aforementioned lead 424, and the lights 68, 70, and 72 are connected by respective leads 460, 462, and 464 into a lead 466 which, like the lead 424, is connected to the lead 161.

At this point it may be noted that the two signal lights under control of any one pole of the ratchet relay 408 is of the same color, which color is distinctive from the other signal lights mounted on the panel 26. Thus, the lights 62 and 70, both controlled by the pole 412, are preferably amber in color. The lights 64 and 68, on the other hand, both controlled by the pole 406, are preferably red in color. Finally, the lights 66 and 72, controlled by the pole 410, are preferably green in color.

The previously mentioned horn relay 264 has an actuating coil 467 connected to the bus bar 152 by a lead 468. The other side of the coil 467 is connected by a lead 470 to a contact 472 of the three-position switch 130. Similarly, a contact 474 of the three-position switch 128 is connected by a lead 476 to the floodlights 82.

*Operation*

It is obvious from the foregoing description that the apparatus 10 is adapted to demonstrate in a constructive and impressive manner the interrelation of the various factors which are particularly significant with respect to the safe operation of motor vehicles. As illustrated in Figure 1, the apparatus simulates actual driving conditions wherein a "student" may be seated in the chair 18 and have at hand, each in normal position, the various controls affecting safety in driving. Preferably, demonstrations are conducted by an "instructor" who, besides instructing the student verbally, may manipulate the various switches and controls mounted in the control cabinet 117 so as to present various simulated situations before the student. Preferably, of course, the operation of the controls in the cabinet 117 is out of sight of the student and, to this end, the cabinet 117 may be located, or may be movable, out of sight of the student.

Now, assuming that a student has taken his place in the driver's position, the apparatus 10 may be energized by manipulation of the master controls located on the auxiliary cabinet 98. The switch 102, for example, serves to connect the bus bar 150 to line and hence energizes the 110-volt system. This will be evidenced by the glowing of the light 108 located immediately above the switch 102. In similar manner, the switch 104 completes a circuit to connect the positive bus bar 154 with an appropriate 6-volt source and cause the light 110 located immediately above the switch 104 to glow. This energization of the bus bar 154 is also extended to the clutch coil 182 so as to establish a driving connection between the motor 80 and the odometer 34.

With both the 110-volt and the 6-volt systems energized, the apparatus 10 is prepared for operation under the influence of the various driver operated controls and is also responsive to the control of the instructor as exercised through the control cabinet 117. The remaining switch 106 in the master control panel 100 serves to energize an aural-visual circuit the operation of which is selectable, as will appear. The indicating light 112 shows whether this latter circuit is energized or not. The switches which control the lights 114 and 116 are not mounted on the master control cabinet 100, but on the control cabinet 117. Inasmuch, however, as these lights show whether or not the circuits for the motor 80 and the timer motor 188 are energized, the lights 114 and 116 have been placed in view of both the student and the instructor.

Directing attention now to the control panel 118 as illustrated in Figure 2, the six switches illustrated at the left hand end of the panel may be regarded as "conditioning" switches under the control of the instructor, while the six three-position toggle switches shown in a horizontal row may be regarded as "instigating" switches. The manual speed control rheostat 144 mounted immediately below the panel 118 is, of course, another conditioning control to be operated by the instructor. This latter control, however, is subject to selective cut-out by the speed control switch 136 in the aforementioned conditioning group.

With both the 110-volt and the 6-volt systems energized as above indicated, closing the switch 132 will energize either the rheostat 96 or the rheostat 144, depending upon the position of the switch 136. From Figure 3, it will be obvious that the arrangement is such that either of these rheostats may be employed for speed control of the motor 80, the selection being made through appropriate positioning of the switch 136. If the pole of the latter is in the illustrated position, wherein the rheostat 96 is energized, the spring biased arm 94, being normally out of contact with the coil 96, prevents the motor 80 being energized. Should, however, the arm 94 be moved by the student in operating the pedal 86 as he normally would the accelerator pedal of an automobile, the motor 80 will be energized and brought up to a speed corresponding with the position of the arm 94 along the rheostat resistor 96. When the student relaxes the pressure on the pedal 86, the arm 94 is spring retracted toward its normally open position. Movement of the switch 136 from the "Pedal" to the "Manual" position causes the rheostat 96 to be deenergized and the rheostat 144 to be energized, whereupon manual control of the speed of the motor 80 is effected through manipulation of the manual speed knob 146. As has been mentioned, the wheel 74 is driven from the motor 80 and hence turns at a speed corresponding to that of the latter. Clearly, the rotation of the wheel 74 in front of the student, along with the whirring sound produced thereby, provides a pronounced sensation of motion, and, hence, a type of distraction which is ever present in the operation of automotive vehicles.

With the motor switch 132 in the "On" position and the speed control switch 136 in a selected position, movement of the timer motor switch 134 to its "On" position energizes the timer motor 188 and conditions the apparatus 10 for various demonstrations, as will appear. This condition of readiness will be indicated by the glowing of all of the indicating lights on the master control panel 100, except possibly the light 112, which, as before noted, indicates an optional condition of operation.

The student may now be instructed to "operate" his vehicle at whatever speed may be deemed appropriate, whereupon the student will find that by proper manipulation of the pedal 86 the simulated speed of the vehicle represented by the apparatus 10 can be varied at will so as to cause the pointer 38 of the speedometer 30 to reach any point desired on the dial 36. Inasmuch as the dial 54 of the odometer 34 is also adapted to turn in correspondence with the rotation of the wheel 74, the student may be impressed with the fact that increased speeds of operation as indicated by the speedometer 30 are accompanied by an increased rapidity in covering a selected unit distance such, for example, as one hundred feet indicated by a full revolution of the dial 54 of the odometer 34.

Returning to a description of the conditioning group of switches shown at the left hand end of the control panel 118, the circuits which contain the two motor control switches 132 and 136 are easily followed on the diagram of Figure 3 and require no added explanation. The circuit containing the timer motor 188, although somewhat less clear, extends through the switch 134 and the lead 312 to the motor 188, and thence through the leads 288, 284, and 280 to complete the circuit to the bus bar 152. The indicating light 116 is in parallel with the motor 188 and has its circuit extended from the lead 312 through the lead 314 and the light 116, thence through the lead 296 into the lead 294, and ultimately to the lead 280 to rejoin the motor circuit.

The push button switch 142 controls a circuit extending through the lead 276 through the speedometer reset coil 180, through the lead 278, and through the lead 280 to the bus bar 152. The switch 142 also controls the parallel circuit comprising the lead 282 and the timer reset coil 192, the latter being connected directly to the aforementioned lead 280.

The push button switch 138 controls the circuit through the unlatching coil 338 of the latching relay 228, and is therefore effective to withdraw the latch 340 so that the poles 226 and 330 of the relay 228 may return to their normal spring biased positions.

The push button switch 140 serves to actuate the ratchet relay 408 through a circuit including the lead 422, the actuating coil 407 of the relay 408, the lead 424, and the lead 161 extending to the bus bar 152.

Directing attention now to the three-position toggle switches shown on the right hand portion of the operating panel 118, it will be observed from Figure 3 that each of these switches may be operated from a center open position to a position which will energize the auxiliary connecting lead 374 by connecting the same with the bus bar 150. This energization of the auxiliary lead 374 is extended through the lead 404 to the pole 406 of the ratchet relay 408. If the pole 406 is in the position illustrated in Figure 3, the circuit will be extended through the contact 442 and the lead 452 to the signal light 68, thence through the leads 460, 466, and 161 to the bus bar 152. If, on the other hand, the pole 406 is in engagement with the contact 440, instead of with the contact 442, the circuit will be extended on through the lead 450 to the signal light 64, and thence through the leads 456, 424, and 161 to the bus bar 152. Inasmuch as both the light 64 and the light 68 are red in color, it is obvious that the above described energization of the auxiliary connecting lead 374 by actuation of any of the six three-position switches connected therewith will cause a red light to glow, regardless of the position of the ratchet relay 408.

Another result of energizing the auxiliary connecting lead 374 is to complete a circuit therefrom through the lead 400, the coil 401 of the relay 202, and the lead 402 to the bus bar 152. This causes both switches of the relay 202 to close so as, normally, to complete circuits in both the 110-volt and 6-volt systems. For example, closure of the pole 200 upon the contact 204 normally completes one 6-volt circuit from the bus bar 154 through the lead 194, the speedometer locking coil 178, the leads 196 and 198, the now closed pole 200 and contact 204, and the lead 206 to the bus bar 156, and another 6-volt circuit from the bus bar 154 through the lead 207, the odometer unlocking coil 181, and the lead 208 to join the previously recited circuit through the lead 198. At the same time, closure of the pole 324 upon the contact 322 normally completes a circuit from the 110-volt bus bar 150 through the leads 157 and 334, through the normally closed switch elements 330 and 328 of the latching relay 228, through the lead 326 and the now closed switch elements 324 and 322, through the lead 320 and the timer clutch coil 190, through the lead 318 and the normally closed switch elements 316 and 292 of the relay 218, and through the leads 290, 284, and 280 to the bus bar 152.

As previously indicated, energization of the timer clutch coil 190 connects the pointer 46 with the motor 188 so as to effect a timing operation. The timing operation will obviously continue until the clutch coil 190 is deenergized, which may, of course, occur upon the opening of any of the switches in the clutch coil circuit traced above. For example, the timer clutch coil circuit may be broken by separation of the switch elements 328 and 330 upon actuation of the relay 228, or it may be broken upon separation of the switch elements 292 and 316 upon actuation of the relay 218. It is particularly to be noted that deenergization of the timer clutch coil 190 is not dependent upon the reopening of those switch elements which normally complete this circuit. Hence, the timing operation can be completed without the necessity for deenergizing the relay 202 or for returning to its central open position the particular three-position switch by means of which the coil 401 of the relay 202 was originally energized.

In addition to opening the timer clutch coil circuit as above described, actuation of the latching relay 228 effects simultaneous actuation of the relay 218, the circuit through the coil 216 of the relay being completed from the bus bar 154 through the now closed switch elements 226 and 230 of the relay 228, through the leads 232 and 214, through the coil 216 itself, and on through the leads 220 and 222 to the bus bar 156. As mentioned above, actuation of the relay 218 is effective to open the circuit through the timer clutch coil 190 at the now open switch elements 292 and 316. In addition, however, the previously described 6-volt circuit established through the clutch coil 182 of the odometer 34, upon energization of the bus bar 154, is opened through disengagement of the pole 250 from the contact 248. The immediate engagement of this same pole with the contact 246, however, completes a circuit from the bus bar 154 through the lead 238, the brake coil 184 of the odometer 34, through the now closed switch elements 246 and 250, and through the leads 252 and 222 to the bus bar 156. Clearly, then actuation of the relay 218 is effective, not only to terminate a timing operation, but also to terminate a simulated measuring operation of the odometer 34. The indicating light 42, connected in parallel with the relay coil 216 shows whether or not the latter is energized.

It is to be noted that energization of the coil 216 of the relay 218 may be variously effected. For example, manipulation of the three-position switch 120 so as to close the pole 210 upon the contact 212 completes a circuit from the bus bar 154 through the lead 208, the switch elements 210 and 212, the lead 214, the coil 216, and the leads 220 and 222 to the bus bar 156. Also, however, the coil 216 is energized upon actuation of the latching relay 228 through closure of the switch elements 226 and 230 therein. This latter circuit extends from the bus bar 154 through the lead 224 and the now closed switch elements 226 and 230, through the leads 232 and 214 to the coil 216, and thence through the leads 220 and 222 to the bus bar 156.

Energization of the coil 332 of the latching relay 228 may also be variously effected. In one instance, for example, it may occur upon completion of an automatically timed operation. Such an operation is effected by operating the three-position switch 122 in the direction to close the poles 346 and 365 upon the contacts 344 and 366, respectively. Inasmuch as the closing of the pole 365 upon the contact 366 clearly serves to energize the auxiliary connecting lead 374 through the leads 370 and 372, the timing operation previously described will be instigated, and the pointer 46 of the timer 32 will begin to revolve. As soon as the pointer 46 makes substantially one complete revolution, however, it engages the contact 50 and thus completes a circuit which extends from the bus bar 150 through the previously closed switch elements 346 and 344, the lead 342, the coil 332, the leads 348 and 302, the now closed contact 50 and pointer 46, and the leads 286, 284 and 280 to the bus bar 152.

The coil 332 of the relay 228 may also be energized upon actuation by the student of the "brake" switch 88. As previously noted, this double pole, single throw, normally open switch is connected so that actuation thereof completes a circuit from the bus bar 150 through the leads 157 and 352, the now closed switch elements 351 and 350, and the lead 349 to the coil 332, thence through the lead 353, the now closed switch elements 354 and 355, the lead 356 to the bus bar 152.

When it so happens that pressure applied to the "brake" pedal 84 is sufficient to actuate the ratchet switch 90, as well as the switch 88, and thus to effect closure of the pole 358 upon the contact 357, a circuit will be completed from the bus bar 150, through the lead 157, the switch 90, and the lead 359 to the red spotlight 83, and thence by way of the lead 360 to the bus bar 152. The light 83, of course, remains energized until the switch 90 is again actuated from the pedal 84.

The "beam deflecting" switch 22, actuated by direct foot pressure in conventional manner, is effective to complete a similar light circuit, from the bus bar 150, through the leads 157 and 158, through the now closed switch 22, through the lead 363 to the floodlights 82, and thence through the lead 364 to the bus bar 152. This circuit also is deenergized through a second actuation of the switch 22.

Directing attention now to the four single pole three-position switches 124, 126, 128, and 130, it will be noted that actuation of these switches from their central open positions in a direction other than to effect energization of the auxiliary connecting lead 374 provides different signal responses, all of which are normally encountered in traffic. Thus, closing the pole of the switch 124 onto the contact 420 thereof completes a circuit through the lead 416 and the pole 412 of the ratchet relay 408 to one or the other of the contacts 430 or 434 of the latter relay. If, as illustrated, the pole 412 is disposed in engagement with the contact 434, the circuit will be completed on through the lead 444, the signal light 70, and the leads 462, 466, and 161 to the bus bar 152. If, on the other hand, the pole 412 should be in engagement with the contact 430, the circuit will be completed on through the lead 432, the signal light 62, and the leads 454, 424, and 161 to the bus bar 152. Inasmuch as both the signal light 62 and the signal light 70 are amber in color, it is clear that the above described actuation of the switch 124 causes an amber light to glow, but that the particular amber light is determined by the condition of the ratchet relay 408.

Actuation of the switch 126 so as to close its pole upon the contact 418 produces a result which is analogous to that above described in respect to the switch 124. From the switch 126, the circuit extends through the lead 414 to the pole 410 of the relay 408, and thence either through the contact 438, the lead 448, the signal light 72, and the leads 464, 466, and 161 to the bus bar 152, or through the contact 436, the lead 446, the signal light 66, and the leads 458, 424, and 161 to the bus bar 152. In either case a green light will be caused to glow.

Actuation of the switch 128 so as to close its pole upon the contact 474 completes a circuit therefrom through the lead 476, through the parallel floodlights 82, and thence through the lead 478 to the bus bar 152. The floodlights 82 being directed into the eyes of the student serve to simulate the glare of approaching headlights, and thus to create a form of distraction often encountered in driving.

Finally, actuation of the switch 130 so as to close its pole upon the contact 472 completes a circuit through the lead 470, through the coil 467 of the horn relay 264, and thence through the lead 468 to the bus bar 152. This energization of the coil 467 effects closure of the normally open switch elements 262 and 268, which, in turn, completes a 6-volt circuit from the bus bar 154, through the lead 162, through the actuating coil 258 of the horn 256, and thence through the lead 260, the now closed switch elements 262 and 268, and the lead 270 to the bus bar 156. Thus, actuation of the switch 130 serves to sound the horn 256 and hence to provide a well known distraction which also occurs frequently in modern traffic.

The aural-visual circuit previously described as being optional is controlled by the single pole, single throw switch 106 connected directly into the bus bar 150. Closing this switch 106 establishes a circuit through the leads 298 and 300, through the indicating light 112, and through the leads 294 and 280 to the bus bar 152. The consequent glowing of the light 112 indicates that the aural-visual circuit is prepared for use. The circuit itself is established from the switch 106 through the leads 298, the neon light 52, and the lead 302 to the contact 50 mounted in the timer 32. The neon light 52, of course, represents the visual portion of the circuit. The aural portion of the circuit comprises the chime 306, which, along with its transformer 304, is connected in parallel with the neon light 52 by means of the leads 308 and 310. Thus, with the switch 106 closed, it is apparent that engagement of the pointer 46 with the contact 50 will complete this aural-visual circuit on through the pointer 46 and the leads 286, 284 and 280 to the bus bar 152. The result will be a flash of the neon light 52 and a chime signal from the chime 306 each time the pointer 46 engages the contact 50. Hence, during a timing operation, the elapse of a predetermined increment of time is indicated both to the eye and to the ear of the student.

With the apparatus 10 operating as above described, it is apparent that many useful demonstrations may be provided. For example, in demonstrating to a student his reaction time, the student is advised to accelerate to any speed up to 90 miles per hour, but, upon the appearance of a red signal light, to transfer his foot as quickly as possible from the accelerator pedal 86 to the brake pedal 84. At any time thereafter then, the instructor causes a red signal light to glow by actuating any of the six three-position switches as above described. As soon as the red light comes on, however, the speedometer pointer 38 will be locked in position, the timer 32 will commence a timing operation, and the odometer dial 54 will begin to rotate so as to indicate distance traveled at the indicated speed. Just as soon as the student can actuate the switch 88, however, by depressing the brake pedal 84, both the timer pointer 46 and the odometer dial 54 will be stopped. Thus, there will be established, not only the time of reaction, but also the distance which would have been traversed by a vehicle moving at the indicated speed during the time it took the student merely to react. The latter figure is particularly important for the reason that many persons are gratified to learn that their reaction time in response to the above described stimulus is only a fraction of a second, say $70/100$ for example, but are very much surprised to learn that an automobile moving at 50 miles per hour for this length of time travels some 51 feet, or almost three car lengths.

While it is, of course, desirable that drivers of automotive vehicles be trained to apply their brakes as quickly as possible when the need arises, situations often occur wherein a hard application of the brakes is worse than no braking at all. Seldom, as a matter of fact, does a skidding stop turn out to be the shortest possible. Thus, the application of excessive pressure to the brake pedal 84 is made known both to the student and to the instructor by the glowing of the red light 83, caused by inadvertent actuation of the ratchet switch 90.

It has been found that many people are quite unaware that a second of time is a substantial period during which many things can happen. In order to impress upon the student the actual length of time from one second to another, the timer 32 alone may be put into operation by the above described manipulation of any of the six instigating switches. If then, the switch 106 be also closed, the neon light 52 and the chime 306 will be energized each time the pointer 46 of the timer 32 passes over the contact 50. It will be clear, of course, that the first engagement of the pointer 46 with the contact 50 will be very slightly less than one full second after the commencement of the timing operation due to the placement of the contact 50 just short of a full revolution of the pointer 46. Subsequent engagements between the elements 46 and 50, however, will be at precise one-second intervals.

To demonstrate the distance traveled at various speeds in a specified length of time, such, for example, as one second, the motor 80 may be operated, as under control of the rheostat 144, to establish and maintain any desired simulated speed. If then the switch 122 be operated to close the poles 346 and 365 upon the contacts 344 and 366, respectively, the timer pointer 46 and the dial 54 of the odometer 34 will be started as previously described and will run for substantially one second, or until the pointer 46 engages the contact 50, whereupon the latching relay 228 is actuated as previously described with the result that both the pointer 46 and the odometer dial 54 are stopped. Again, the previously described placement of the contact 50 so as to be engaged very slightly before elapse of a full second enables mechanical delay and inertia of the odometer parts to be taken into account in the reading of the dial 54, which then indicates very accurately the distance traveled in one second at the speed indicated by the locked pointer 38 of the speedometer 30. This demonstration enables the instructor to prove the simple formula that "1½ times the speed equals the approximate distance traveled in one second," thus providing added knowledge to the student of the relation of speed to time and distance.

If it be desired to demonstrate the time required to travel a specified distance at a given speed, the simulated speed condition can be established as before, and the switch 120 actuated to close the pole 388 upon the contact 386. This starts the timer and the odometer. By watching the rotating dial 54 of the odometer 34, the distance traveled can be observed and when the predetermined length, such as 400 feet, for example, has been traveled, the switch 120 is quickly reversed so as to close the pole 210 upon the contact 212. This stops both the odometer 34 and the timer 32 so that the elapsed time can be read from the latter.

The various distractions, such as the horn 256, the floodlights 82, etc., may be used in whatever manner seems best for a full test of individual students. The signal light clusters, having their colored lights arranged in different order, provide means for testing a student for color blindness, inasmuch as such an arrangement makes it impossible to name the color solely by its position in the cluster. In addition, by having the signal lights horizontally spaced, it requires the student to maintain a wide visual alertness, similar to driving conditions encountered in approaching an intersection.

Clearly, there has been provided an apparatus which fulfills the objects and advantages sought therefor.

It will be understood that the foregoing description and the accompanying drawings are given only by way of illustration and example. It is further to be understood that changes in the form of the elements, rearrangement of parts, or the substitution of equivalent elements, all of which will be obvious to those skilled in the art, are within the scope of the invention, which is limited only by the claims which follow.

What is claimed is:

1. In an apparatus for demonstrating factors affecting traffic safety, in combination, means simulating a driver's station including a seat, a steering wheel, an accelerator pedal, and a brake pedal all disposed in conventional relation, means including rotatable means confronting the driver's station for producing both sound and motion for indicating simulated movement of an automotive vehicle, additional means confronting the driver's station for indicating various simulated traffic conditions and changes therein at will, control means operatively connected with said accelerator pedal and said brake pedal for controlling said means for producing sound and motion, and additional control means for selectively controlling said additional means for indicating selected individual simulated traffic conditions at will, said additional control means being located out of the normal visual range of one occupying said seat, the means for producing both sound and motion comprising a wheel having angularly spaced radial elements, and means for rotating the wheel at variable speed.

2. In an apparatus for demonstrating factors affecting traffic safety, in combination, means simulating a driver's station including a seat, a steering wheel, an accelerator pedal, and a brake pedal all disposed in conventional relation, means including rotatable means confronting the driver's station for producing both sound and motion for indicating simulated movement of an automotive vehicle, additional means confronting the driver's station for indicating various simulated traffic conditions and changes therein at will, control means operatively connected with said accelerator pedal and said brake pedal for controlling said means for producing sound and motion, and additional control means for selectively controlling said additional means for indicating selected individual simulated traffic conditions at will, said additional control means being located out of the normal visual range of one occupying said seat, the additional means for indicating simulated traffic conditions comprising at least two sets of colored signal lights, said sets of signal lights being laterally remote from each other and each comprising similar clusters of at least three lights arranged in different order of colors, said additional control means including means for selecting either set for operation to the exclusion of the other.

3. In an apparatus for demonstrating factors affecting traffic safety, in combination, means simulating a driver's station including a seat, a steering wheel, an accelerator pedal, and a brake pedal all disposed in conventional relation, means including rotatable means confronting the driver's station for producing both sound and motion for indicating simulated movement of an automotive vehicle, additional means confronting the driver's station for indicating various simulated traffic conditions and changes therein at will, control means operatively connected with said accelerator pedal and said brake pedal for controlling said means for producing sound and motion, and additional control means for selectively controlling said additional means for indicating selected individual simulated traffic conditions at will, said additional control means being located out of the normal visual range of one occupying said seat, the additional means for indicating simulated traffic conditions comprising red, green, and amber signal lights arranged in a conventional traffic signal pattern, a flood light directed toward the seat, and a horn, and wherein said additional control means includes manually operable switch means for operating the individual items at will.

4. In an apparatus for demonstrating factors affecting traffic safety, the combination of means for simulating actual driving operations including means for indicating varying simulated rates of speed in miles per hour, means for simulating actual traffic conditions including means for suddenly instigating a selected condition of traffic, means for indicating the distance in feet that would be traveled by an actual vehicle moving at the simulated rate of speed between the time of a sudden instigation of a selected condition of traffic and the subsequent initiation of a selected operation of driving, the means for simulating actual driving operations including a movable spring-biased brake pedal, and wherein a selected operation of driving may comprise depressing said brake pedal, and means including a switch associated with said brake pedal for detecting and signaling the application of greater than a predetermined foot pressure upon said brake pedal.

References Cited in the file of this patent

UNITED STATES PATENTS

| | | |
|---|---|---|
| 1,824,513 | Tibbetts | Sept. 22, 1931 |
| 2,084,440 | Heinis | June 22, 1937 |
| 2,088,264 | Heinis | July 27, 1937 |
| 2,177,501 | Smalley | Oct. 24, 1939 |
| 2,192,602 | Meshberg | Mar. 5, 1940 |
| 2,224,564 | De Silva | Dec. 10, 1940 |
| 2,267,504 | Morley et al. | Dec. 23, 1941 |
| 2,273,091 | De Silva | Feb. 17, 1942 |
| 2,334,523 | Welch | Nov. 16, 1943 |
| 2,341,678 | Wickes | Feb. 15, 1944 |
| 2,468,781 | Roganti | May 3, 1949 |
| 2,531,448 | Lingenfelder | Nov. 28, 1950 |
| 2,540,751 | Mumma | Feb. 6, 1951 |
| 2,559,910 | White | July 10, 1951 |
| 2,715,783 | Chedister et al. | Aug. 23, 1955 |
| 2,814,131 | Sheppard | Nov. 26, 1957 |
| 2,845,721 | Adler | Aug. 5, 1958 |

FOREIGN PATENTS

| | | |
|---|---|---|
| 714,921 | Great Britain | Sept. 8, 1954 |